United States Patent [19]

Incorvia

[11] Patent Number: 5,573,725
[45] Date of Patent: Nov. 12, 1996

[54] CORROSION INHIBITION SYSTEM FEATURING THE REACTION PRODUCT OF A POLYTHIOETHER POLYOL AND FATTY ACID

[75] Inventor: Michael J. Incorvia, Houston, Tex.

[73] Assignee: Texaco Inc., White Plains, N.Y.

[21] Appl. No.: 350,868

[22] Filed: May 12, 1989

[51] Int. Cl.⁶ ..................................................... C23F 11/10
[52] U.S. Cl. ........................... 422/7; 252/395; 507/939; 507/253
[58] Field of Search ............................. 252/395, 8.555; 422/14, 12, 7

[56] References Cited

U.S. PATENT DOCUMENTS

| | | | |
|---|---|---|---|
| 2,540,570 | 2/1951 | Cyphers | 417/500 |
| 2,947,599 | 8/1960 | Ennis | 252/395 X |
| 3,158,576 | 11/1964 | Rudel et al. | 252/395 X |
| 3,278,434 | 10/1966 | Hoffman | 252/395 X |
| 3,312,743 | 4/1967 | Schmelzer | 568/46 |
| 3,692,675 | 9/1972 | Nimerick | 252/8.555 X |
| 3,711,420 | 1/1973 | Jones | 106/14.27 |
| 4,153,464 | 5/1979 | Sturwold et al. | 106/14.27 |
| 4,366,307 | 12/1982 | Singh et al. | 568/373 |
| 4,459,158 | 6/1984 | Lindstrom et al. | 252/395 X |
| 4,664,193 | 5/1987 | Wee | 252/8.555 X |
| 4,664,826 | 5/1987 | Gutierrez et al. | 252/395 X |
| 4,702,850 | 10/1987 | Gutierrez et al. | 252/395 X |
| 4,719,084 | 1/1988 | Schmid et al. | 422/16 |
| 4,744,948 | 5/1988 | Incorvia | 252/395 X |
| 4,759,908 | 7/1988 | Incorvia | 252/395 X |

*Primary Examiner*—John S. Maples
*Assistant Examiner*—Valerie Denise Fee
*Attorney, Agent, or Firm*—Jack H. Park; Kenneth R. Priem; Harold J. Delhommer

[57] ABSTRACT

A series of water-dispersible and oil-dispersible corrosion inhibiting solutions are disclosed which comprise about 10 ppm by volume to about 5% by volume of an acid catalyzed condensation reaction product of a fatty acid and a polythioether polyol represented by the formula:

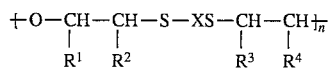

wherein $R^1$, $R^2$, $R^3$ and $R^4$ are H, a methyl group, or an ethyl group, X is a divalent organic radical selected from the group consisting of $-C_2H_4-$, $-C_4H_8-$, $-C_2C_4OC_2H_4-$, and $C_2H_4SC_2H_4-$, and n is about 2 to about 40. Metal equipment can be protected through the use of the invention corrosion inhibiting solutions by contacting metal with an effective amount of inhibiting solution containing the polythioether polyol/fatty acid reaction product in a continuous exposure or batch treatment.

13 Claims, No Drawings

CORROSION INHIBITION SYSTEM FEATURING THE REACTION PRODUCT OF A POLYTHIOETHER POLYOL AND FATTY ACID

BACKGROUND OF THE INVENTION

This invention relates to organic inhibitor treating solutions employed to reduce corrosion from harsh fluid environments. More particularly, the invention concerns treating solutions comprising the reaction product of a polythioether polyol and a fatty acid.

Corrosion that occurs in an oil field environment is complex and tends to attack all manner of metal equipment above and below ground. The principle corrosive agents found in the well fluids include hydrogen sulfide, carbon dioxide, oxygen, organic acids and solubilized salts. These agents may be present individually or in combination with each other. Valves, fittings, tubing, pumps, precipitators, pipelines, sucker rods and other producing equipment are particularly susceptible. Deposits of rust, scale, corrosion by-products, paraffin and other substances create ideal environments for concentration cells. Carbon dioxide and hydrogen sulfide induced pitting is encouraged by such deposits. Acidic condensate that collects on metal tubing will also cause pitting. Extreme temperatures and pressures in downhole environments further accelerate corrosion.

Very often as oil fields mature and enhanced recovery methods such as water flooding are instituted, the concentration of hydrogen sulfide in the well fluids increases dramatically. This increase in concentration and its related effect on the extent of pitting corrosion may make older fields economically unattractive due to to excessive corrosion costs.

Various sulfur compounds have been employed for many years in corrosion inhibitor systems, either alone or in combination with other components of inhibitor systems, such as amines, amides, surfactants, various aromatic compounds, phosphorus compounds and solubilizers. Dithiolanes having a specified formula of RR'COR" are proposed in U.S. Pat. No. 2,912,386 as corrosion inhibitors for acid attack on steel. According to the patent, R is a univalent organic radical having a specified formula, R' is a divalent hydrocarbon radical of less than 8 carbon atoms, and R" is OH, $NH_2$, lower alkoxy or an alkali metal such as Na. The preferred additive is 5-(1,2-dithiolan-3-yl)pentanoic acid. U.S. Pat. No. 3,791,789 discloses dithiolium compounds as corrosion inhibitors. And U.S. Pat. No. 3,697,221 describes the use of thionium derivatives, especially quaternary derivatives of dithiole-3-thiones as corrosion inhibitors.

U.S. Pat. No. 2,474,603 describes the use of corrosion inhibition systems containing a mixture of a butyl mercaptan along with sulfur containing compounds such as sulfides. A discussion on the use of alkyl mercaptans is also contained in Trabanelli, Zucchi, Gullini and Carassiti, "Inhibition of Acid Corrosion of Iron By Sulfur Organic Compounds", *Fourth International Congress on Metallic Corrosion,* p. 602–5 (1972).

An aliphatic dithiol of the formula $HS(CH_2)_nX(CH_2)_mSH$ where X equals O, S or NH, and n and m equal 1–20, is disclosed in Chemical Abstracts 88:40725p. A lubricating oil additive with excellent antioxidant anticorrosion properties is disclosed in U.S. Pat. No. 4,188,297. This lubricating additive is the reaction product of olefins with sulfur and certain mercaptans wherein the reaction product contains a high percentage of sulfur, such as about 25% sulfur. U.S. Pat. No. 4,495,336 discloses the use of mercapto-polycarboxylic acids as corrosion inhibitors.

Hydroxy terminated polythioethers are disclosed as invention compounds in U.S. Pat. No. 4,366,307. The polythioethers are taught as being useful as elastomers, plasticizers, high temperature lubricants, non-curing sealants and a component in a fuel resistant coating for steel. U.S. Pat. No. 4,759,908 teaches the use of corrosion inhibition systems containing polythioethers represented by the formula:

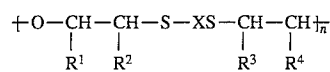

where $R^1$, $R^2$, $R^3$, and $R^4$ are H, a methyl group, or an ethyl group, X is a divalent organic radical selected from the group consisting of $-C_2H_4-$, $-C_4H_8-$, $-C_2H_4SC_2H_4-$, and n is about 2 to about 40.

SUMMARY OF THE INVENTION

A series of water-dispersible and oil-dispersible corrosion inhibiting solutions are disclosed which comprise about 10 ppm by volume to about 5% by volume of an acid catalyzed condensation reaction product of a fatty acid and a polythioether polyol represented by the formula:

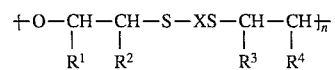

wherein $R^1$, $R^2$, $R^3$ and $R^4$ are H, a methyl group, or an ethyl group, X is a divalent organic radical selected from the group consisting of $-C_2H_4-$, $-C_4H_8-$, $-C_2C_4OC_2H_4-$, and $C_2H_4SC_2H_4-$, and n is about 2 to about 40. Preferably, the polythioether is hydroxyl-terminated. It has been discovered that the use of this reaction product alone or the addition of the reaction product to organic inhibitor systems reduces corrosion.

The reaction product is preferably dissolved in an aromatic solvent such as toluene along with an ester. The reaction product may be added to most organic inhibitor systems. The mixture of reaction product and aromatic solvent is then preferably dispersed in a solvent which in most cases will be water or well fluids in a concentration of about 10 ppm to about 5% by volume of said mixture in water or well fluids.

Metal equipment can be protected through the use of the invention corrosion inhibiting solutions by contacting metal with an effective amount of inhibiting solution containing the polythioether polyol/fatty acid reaction product in a continuous exposure or batch treatment.

DETAILED DESCRIPTION

Perhaps the most costly problem in an oil field environment is corrosion of piping and equipment due to sweet and sour corrosion. It has been discovered that the addition of small amounts of a condensation reaction product of a fatty acid and a particular group of polythioether polyols effectively inhibits corrosion, most especially corrosion from carbon dioxide.

The corrosion inhibiting solution of the invention contains about 10 ppm to about 5% by volume of the reaction product in a solvent which may be water, brine, or a hydrocarbon. The reaction is preferably placed in a mixture of an aromatic solvent and an ester, said mixture delivered to the corrosion sites in a continuous treating solution containing preferably about 20 ppm to about 5000 ppm by volume of said mixture, most preferably about 20 ppm to about 200 ppm of said mixture.

The polythioether polyol reacted with the fatty acid in an acid catalyzed condensation reaction has the formula:

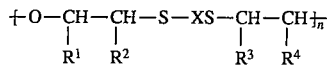

wherein $R^1$, $R^2$, $R^3$ and $R^4$ are H, a methyl group or an ethyl group, X is a divalent organic radical selected from the group consisting of —$C_2H_4$—, —$C_4H_8$—, —$C_2H_4OC_2H_4$—, and $C_2H_4SC_2H_4$—, and n is about 2 to about 40. The term polythioether polyol as used herein is meant to refer to any compound satisfying this formula and definition.

Batch treatments of the polythioether polyol reaction product may also be employed. For batch treatments, the concentration of the reaction product should be about 1% to about 5% by volume. The polyol reaction product, however, can be stored and shipped in solutions with concentrations ranging up to 50% by volume. But at high concentrations, considerable settlement will occur, making it more difficult to accurately dilute the mixtures in the field.

For batch treatments the polythioether is preferably diluted in an aromatic or alcohol solvent with a filming additive such as a surfactant. Aromatic solvents are generally the most preferred solvents for batch filming purposes.

The polythioether polyols most preferred for reaction with the fatty acid in the invention corrosion inhibiting solution are those polyols of the given formula wherein $R^1$, $R^2$, $R^3$ and $R^4$ are H or a methyl group, and X is a $C_2H_4$ radical.

The polyol reaction product is water insoluble except at very low concentrations below about 50 ppm. It is water-dispersible at low concentrations and oil-dispersible. Fatty esters, amines and surfactants can be used to increase water dispersibility. With some hydrocarbon solvents, they may be soluble. Thus, a wide range of solvents may be employed in the corrosion inhibiting system. The solvent may be water, brine, a hydrocarbon, or a hydrocarbon and brine mixture, most preferably, a hydrocarbon. Most preferably, the polyol/fatty acid reaction product will be placed in a mixture of an aromatic solvent and a fatty ester, and said mixture dispersed in the well fluids at the 10 ppm to 5% by volume concentration.

Although the reaction product may be dispersed in water at low concentrations, problems can result with additives such as amines and fatty esters. Thus, aromatic solvents are generally necessary to create the mixture to be dispersed in well fluids. If the $R^1$, $R^2$, $R^3$ and $R^4$ groups of the polythioether polyol are ethyl, or X is a divalent organic radical of a relatively high molecular weight, the reaction product will be difficult to disperse in water or alcohol solvents, as well as being more expensive to synthesize. It should be noted again that most organic inhibitors presently used in the oil field can be employed in the invention solution containing the reaction product with improved corrosion results as long as the inhibitors are partially oil and water-dispersible.

Corrosion inhibition is strongly improved by the use of a mixture of the reaction product, aromatic solvent and an ester, preferably a fatty methyl or fatty ethyl ester, of about 10 ppm to about 5%, preferably about 10 ppm to about 5000 ppm by volume of the mixture in well fluids or water. The mixture is preferably blended in about a 40/60 to about 90/10 ratio of reaction product to aromatic solvent and ester. A preferred fatty methyl ester is the ester sold under the trademark WITCO KEMESTER® 105 by WITCO Chemical Co. WITCO KEMESTER® 105 contains about 85% unsaturated $C_{18}$ in the fatty alkyl chain and has an approximate molecular weight of 294.

The fatty acid/polythioether polyol condensation reaction is conducted at an elevated temperature, preferably at a refluxing temperature of an aromatic solvent containing the reactants, for a period of about 15 minutes to about three hours. The condensation reaction is acid catalyzed by such acids as sulfuric acid and hydrochloric acid.

The corrosion inhibiting solutions of the invention which contain the instant condensation reaction product of polythioether polyol and fatty acid may be employed in different industries where metals come under attack. They are particularly effective in solving the corrosion problems which result from sweet systems. Since the solutions offer substantial improvement over present inhibitor systems, they may be used to protect downhole piping and equipment in situations such as subsurface water injection for pressure maintenance, water disposal systems, or even drilling applications, as well as in above-ground, oil or water flow lines and equipment.

The invention solution may be employed in both general methods of inhibiting solution treatment, continuous injection and batch. Either method, continuous injection or batch, permits the organic inhibitor solution containing the reaction product to contact the metal to be protected and form an organic barrier over the metal.

The effectiveness of a given organic inhibitor system generally increases with the concentration, but because of cost considerations most solutions when fully diluted in their working environment must be effective in quantities less than about 0.01% by weight (100 ppm). The invention solution is believed effective throughout the range of about 10 ppm to about 200 ppm in a continuous injection method.

If a batch method is employed, a slug of inhibiting solution containing the polythioether should be injected into a closed system with a concentration of preferably about 1% to about 5% in the inhibiting solution. Of course, various surfactants, solubilizers and organic inhibitors may be added to the inhibiting solution to enhance its film-forming ability and effectiveness. The solution should be allowed to remain in contact with the metal to be protected for a sufficient time to form a durable film. The contact time period is preferably at least 12 hours, preferably 24 hours. Afterwards, normal production or flow of fluids should be resumed, flushing out excess inhibitor solution. The batch treatment should be repeated when necessary to maintain film durability over the metal to be protected.

At present, an industry established procedure for testing oil field corrosion inhibitors does not exist. Because of widely varying corrosion conditions in the oil field, it is impractical to establish a universal standard laboratory test. But it is desirable to have tests that are easily duplicated and can approximate the continuous type of liquid and gas exposure that occurs in wells and flow lines in the oil field. A continuous exposure wheel test has achieved some following in the industry. The continuous exposure procedure set forth in the January 1968 issue of "Material Protections" at pages 34–35 was followed for Examples 1–4. The test offers an excellent indication of the ability of corrosion inhibitors to protect metals immersed in either sweet or sour fluids.

The following examples will further illustrate the novel corrosion treating solutions of the present invention containing said polythioether polyol/fatty acid reaction product. These Examples are given by way of illustration and not as limitations on the scope of the invention. Thus, it should be understood that materials present in the corrosion treating solutions may be varied to achieve similar results within the scope of the invention.

CONTINUOUS EXPOSURE TESTS

Metal specimens were immersed in sweet fluid environments for seventy-two (72) hours to approximate continuous exposure conditions in the oil field. The sweet fluid test environment was established by gassing the test solution with carbon dioxide. The specimens were tested in carbon dioxide, with and without the claimed reaction product of polythioether polyol and fatty acid. The extent of corrosion with the reaction product was compared to corrosion measured without the inhibition solution to yield a percent inhibition due to the reaction product corrosion inhibiting solution.

The metal test specimens were cold-rolled, mild steel coupons which measured 3 inches by 0.5 inches by 0.005 inches. These coupons were initially cleaned in order to remove any surface film, dried and then weighed.

Seven ounce glass bottles were filled with a fluid such as brine and depolarized kerosene which simulated an oil-brine environment. It consisted of 20 milliliters of depolarized kerosene, 160 milliliters of a 10% synthetic brine and 2 milliliters of dilute (6%) acetic acid. The synthetic brine contained 10% sodium chloride and 0.5% calcium chloride by weight. The oil-brine test solutions were then gassed for 5 to 10 minutes with carbon dioxide to create a sweet test environment. The solution gassing was designed to remove any dissolved oxygen as well as create the sweet environment.

The corrosion inhibition solution was added to the bottles and the steel test coupons were then placed within the bottles. The bottles were capped and mounted on the spokes of a 23 inch diameter, vertically mounted wheel and rotated for 72 hours at 30 rpm inside an oven maintained at 71° C. for $CO_2$ environment. The coupons were removed from the bottles, washed and scrubbed with inhibited dilute acid for cleaning purposes, dried and weighed. The corrosion rate in mils per year (mpy) was then calculated from the weight loss. One mpy is equivalent to 0.001 inches of metal lost per year to corrosion. Additionally, the test coupons were visually inspected for the type of corrosive attack, e.g., pitting and crevice corrosion or general corrosion.

The sweet (carbon dioxide) corrosion inhibition properties of the condensation reaction product of a hydroxyl-terminated polythioether polyol and a fatty acid were determined according to the above procedure. The polythioether polyol reacted was PERMAPOL® P-900, a polyol sold under that trademark by Products Research and Chemical Corp. Other known polythioether polyols which may be employed to produce the condensation reaction product are PERMAPOL® P-820, PERMAPOL® P-855, and PERMAPOL® P-905, which are sold under those trademarks by Products Research and Chemical Corp. The above polythioether polyols fit the general formula disclosed herein, wherein X is believed to be an ethyl radical. On an average basis three of the R groups ($R^1, R^2, R^3, R^4$) are hydrogen and one of the R groups is methyl ($CH_3$) for all four of the PERMAPOL® polythioether polyols. It is believed that the PERMAPOL® P-900 of Examples 1–8 has an average molecular weight of 500 and n equal to about 2.8.

It is believed that PERMAPOL® P-820 has an average molecular weight of 1300, PERMAPOL® P-855 has an average molecular weight of 3200, and PERMAPOL® P-905 has an average molecular weight of 1000. It is also believed that n is about 17.9 for PERMAPOL® P-855.

EXAMPLES 1–8

A mixture of acid catalyzed condensation reaction product, toluene, and fatty methyl ester was prepared by mixing 10 grams of a fatty acid sold under the trademark WITCO Industrene 105 by WITCO Chemical Co. with 10 grams of the polythioether polyol sold under the trademark PERMAPOL® P-900, in a mixture of 10 grams each of toluene and a fatty methyl ester sold under the trademark WITCO Kemester 105 by WITCO Chemical Co. Two to three drops of concentrated hydrochloric acid was added to the mixture. The above mixture was refluxed for one to two hours while collecting a water/toluene azeotrope in a side-arm condenser. The solution was placed within the test bottles in the concentrations noted in Table 1 to test for corrosion inhibition.

The corrosion inhibition systems of Examples 1–4 were also tested with the addition of 0.1% by weight of an ethoxylated tertiary amine surfactant sold under the trademark Texaco M-320 by Texaco Chemical Co. The M-320 surfactant contains an average of about 20 ethylene oxide groups.

TABLE 1

| Examples | Inhibitor Concentration | % Inhibition | % Inhibition With Surfactant |
|---|---|---|---|
| 1 | 50 ppm | 67% | 88% |
| 2 | 100 ppm | 94% | 92% |
| 3 | 200 ppm | 91% | 97% |
| 4 | 1000 ppm | 83% | 98% |

These inhibition systems deliver outstanding sweet corrosion control at anywhere from 50 ppm to 1000 ppm. The systems were particularly effective with the ethoxylated M-320 surfactant to increase filming. However, the 94% and 91% sweet corrosion inhibition provided without surfactant at 100 ppm and 200 ppm concentrations respectively, were also outstanding results.

Other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A water-dispersible corrosion inhibiting solution, comprising:

a solvent; and about 10 ppm by volume to about 5% by volume of a corrosion inhibiting acid catalyzed condensation reaction product of a fatty acid and a polythioether polyol, said polythioether polyol represented by the formula:

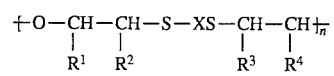

where $R^1$, $R^2$, $R^3$, and $R^4$ are H, a methyl group, or an ethyl group, X is a divalent organic radical selected from the group consisting of —$C_2H_4$—, —$C_4H_8$—, —$C_2H_4SC_2H_4$—, and n is about 2 to about 40.

2. A water-dispersible corrosion inhibiting solution, comprising:

a solvent; and about 10 ppm by volume to about 5% by volume of a mixture of an aromatic solvent, an ester, and a corrosion inhibiting acid catalyzed condensation reaction product of a fatty acid and a polythioether polyol, said polythioether polyol represented by the formula:

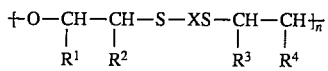

where $R^1$, $R^2$, $R^3$, and $R^4$ are H, a methyl group, or an ethyl group, X is a divalent organic radical selected from the group consisting of $-C_2H_4-$, $-C_4H_8-$, $-C_2H_4SC_2H_4-$, and n is about 2 to about 40.

3. The corrosion inhibiting solution of claim 2, wherein the acid catalyst is sulfuric acid or hydrochloric acid.

4. The corrosion inhibiting solution of claim 2, wherein the fatty acid and polythioether polyol are reacted in proportions ranging from about 0.25/0.75 to about 0.8/0.2 by weight.

5. The corrosion inhibiting solution of claim 2, wherein the fatty acid and the polyol are reacted at elevated temperature for about 15 minutes to about three hours.

6. The corrosion inhibiting solution of claim 2, further comprising reacting the fatty acid and the polyol in a mixture of the aromatic solvent and ester in about a 40/60 to about 90/10 ratio of solvent to reactants.

7. The corrosion inhibiting solution of claim 2, wherein the reaction takes place at a refluxing temperature of the aromatic solvent.

8. The corrosion inhibiting solution of claim 2, wherein the ester is a fatty methyl ester or fatty ethyl ester.

9. The corrosion inhibiting solution of claim 2, wherein the aromatic solvent is toluene.

10. The corrosion inhibiting solution of claim 2, wherein the concentration of said mixture in said solvent ranges from about 20 ppm to about 5000 ppm by volume.

11. A water-dispersible corrosion inhibiting solution, comprising:

a solvent; and about 20 ppm by volume to about 5000 ppm by volume of a mixture of an aromatic solvent, a fatty methyl ester, and a corrosion inhibiting acid catalyzed condensation reaction product of a fatty acid and a polythioether polyol, said polythioether polyol represented by the formula:

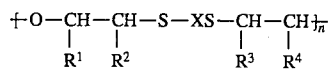

where $R^1$, $R^2$, $R^3$, and $R^4$ are H, a methyl group, or an ethyl group, X is a divalent organic radical selected from the group consisting of $-C_2H_4-$, $-C_4H_8-$, $-C_2H_4SC_2H_4-$, and n is about 2 to about 40, said fatty acid and polythioether polyol reacted at a reflux temperature of the aromatic solvent in proportions ranging from about 0.25/0.75 to about 0.8/0.2 by weight for about 15 minutes to about three hours.

12. A method of protecting metals from corrosive agents in hydrocarbon and aqueous fluids which comprises contacting the metal with an effective amount of a corrosion inhibiting acid catalyzed condensation reaction product of a fatty acid and a polythioether polyol, said polythioether polyol represented by the formula:

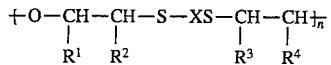

where $R^1$, $R^2$, $R^3$, and $R^4$ are H, a methyl group, or an ethyl consisting of $-C_2H_4-$, $-C_4H_8-$, $-C_2H_4SC_2H_4-$, and n is about 2 to group, X is a divalent organic radical selected from the group about 40.

13. The method of claim 12, wherein said reaction product is mixed with fluids so that a concentration of about 10 ppm by volume to about 5% by volume of said reaction product continuously contacts the metal.

* * * * *